United States Patent
Gentle et al.

(10) Patent No.: US 7,359,979 B2
(45) Date of Patent: Apr. 15, 2008

(54) PACKET PRIORITIZATION AND ASSOCIATED BANDWIDTH AND BUFFER MANAGEMENT TECHNIQUES FOR AUDIO OVER IP

(75) Inventors: Christopher R. Gentle, Campcrdown (AU); Paul Roller Michaelis, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 1287 days.

(21) Appl. No.: 10/262,621

(22) Filed: Sep. 30, 2002

(65) Prior Publication Data

US 2004/0073692 A1 Apr. 15, 2004

(51) Int. Cl.
*G06F 15/16* (2006.01)

(52) U.S. Cl. ............... 709/231; 709/231; 709/238; 704/210; 704/233

(58) Field of Classification Search .............. 709/231, 709/224, 238, 240, 232; 704/210, 214, 233
See application file for complete search history.

(56) References Cited

U.S. PATENT DOCUMENTS

| 4,791,660 A | 12/1988 | Oye et al. |
| 5,067,127 A | 11/1991 | Ochiai |

(Continued)

FOREIGN PATENT DOCUMENTS

| WO | WO 91/14278 | 9/1991 |

(Continued)

OTHER PUBLICATIONS

IEEE Standards for Information Technology—Telecommunications and information exchange between systems—Local and metropolitan area networks—Common specifications—Part 3: Media Access Control (MAC) Bridges, LAN/MAN Standards Committee of the IEEE Computer Society, ANSI/IEEE Std 802.1D (1998).

(Continued)

*Primary Examiner*—Philip Tran
(74) *Attorney, Agent, or Firm*—Sheridan Ross P.C.

(57) ABSTRACT

The present invention is directed to voice communication devices in which an audio stream is divided into a sequence of individual packets, each of which is routed via pathways that can vary depending on the availability of network resources. All embodiments of the invention rely on an acoustic prioritization agent that assigns a priority value to the packets. The priority value is based on factors such as whether the packet contains voice activity and the degree of acoustic similarity between this packet and adjacent packets in the sequence. A confidence level, associated with the priority value, may also be assigned. In one embodiment, network congestion is reduced by deliberately failing to transmit packets that are judged to be acoustically similar to adjacent packets; the expectation is that, under these circumstances, traditional packet loss concealment algorithms in the receiving device will construct an acceptably accurate replica of the missing packet. In another embodiment, the receiving device can reduce the number of packets stored in its jitter buffer, and therefore the latency of the speech signal, by selectively deleting one or more packets within sustained silences or non-varying speech events. In both embodiments, the ability of the system to drop appropriate packets may be enhanced by taking into account the confidence levels associated with the priority assessments.

51 Claims, 5 Drawing Sheets

U.S. PATENT DOCUMENTS

| | | | |
|---|---|---|---|
| 5,206,903 A | 4/1993 | Kohler et al. | |
| 5,506,872 A | 4/1996 | Mohler | |
| 5,594,740 A | 1/1997 | LaDue | |
| 5,802,058 A | 9/1998 | Harris et al. | |
| 5,828,747 A | 10/1998 | Fisher et al. | |
| 5,905,793 A | 5/1999 | Flockhart et al. | |
| 5,933,425 A | 8/1999 | Iwata | |
| 5,946,618 A | 8/1999 | Agre et al. | |
| 5,953,312 A | 9/1999 | Crawley et al. | |
| 5,961,572 A | 10/1999 | Craport et al. | |
| 5,982,873 A | 11/1999 | Flockhart et al. | |
| 6,038,214 A | 3/2000 | Shionozaki | |
| 6,058,163 A | 5/2000 | Pattison et al. | |
| 6,067,300 A | 5/2000 | Baumert et al. | |
| 6,073,013 A | 6/2000 | Agre et al. | |
| 6,088,732 A | 7/2000 | Smith et al. | |
| 6,122,665 A | 9/2000 | Bar et al. | |
| 6,163,607 A | 12/2000 | Bogart et al. | |
| 6,173,053 B1 | 1/2001 | Bogart et al. | |
| 6,185,527 B1 * | 2/2001 | Petkovic et al. | 704/231 |
| 6,192,122 B1 | 2/2001 | Flockhart et al. | |
| 6,249,757 B1 * | 6/2001 | Cason | 704/214 |
| 6,256,300 B1 | 7/2001 | Ahmed et al. | |
| 6,381,639 B1 | 4/2002 | Thebaut et al. | |
| 6,463,470 B1 | 10/2002 | Mohaban et al. | |
| 6,463,474 B1 | 10/2002 | Fuh et al. | |
| 6,502,131 B1 | 12/2002 | Vaid et al. | |
| 6,526,140 B1 * | 2/2003 | Marchok et al. | 379/406.03 |
| 6,529,475 B1 | 3/2003 | Wan et al. | |
| 6,529,499 B1 | 3/2003 | Doshi et al. | |
| 6,532,241 B1 | 3/2003 | Ferguson et al. | |
| 6,578,077 B1 | 6/2003 | Rakoshitz et al. | |
| 6,601,101 B1 | 7/2003 | Lee et al. | |
| 6,678,250 B1 | 1/2004 | Grabelsky et al. | |
| 6,725,128 B2 | 4/2004 | Hogg et al. | |
| 6,754,710 B1 | 6/2004 | McAlear | |
| 6,760,312 B1 | 7/2004 | Hitzeman | |
| 6,760,774 B1 | 7/2004 | Soumiya et al. | |
| 6,765,905 B2 | 7/2004 | Gross et al. | |
| 6,778,534 B1 | 8/2004 | Tal et al. | |
| 6,798,751 B1 | 9/2004 | Voit et al. | |
| 6,857,020 B1 | 2/2005 | Chaar et al. | |
| 6,954,435 B2 | 10/2005 | Billhartz et al. | |
| 6,964,023 B2 * | 11/2005 | Maes et al. | 715/811 |
| 6,973,033 B1 | 12/2005 | Chiu et al. | |
| 6,988,133 B1 | 1/2006 | Zavalkovsky et al. | |
| 7,003,574 B1 | 2/2006 | Bahl | |
| 7,031,311 B2 | 4/2006 | MeLampy et al. | |
| 7,031,327 B2 | 4/2006 | Lu | |
| 7,046,646 B2 | 5/2006 | Kilgore | |
| 7,076,568 B2 | 7/2006 | Philbrick et al. | |
| 7,103,542 B2 * | 9/2006 | Doyle | 704/231 |
| 7,124,205 B2 | 10/2006 | Craft et al. | |
| 7,212,969 B1 * | 5/2007 | Bennett | 704/273 |
| 7,257,120 B2 | 8/2007 | Saunders et al. | |
| 7,260,439 B2 * | 8/2007 | Foote et al. | 700/94 |
| 2001/0039210 A1 | 11/2001 | ST-Denis | |
| 2002/0073232 A1 | 6/2002 | Hong et al. | |
| 2002/0091843 A1 | 7/2002 | Vaid | |
| 2002/0105911 A1 | 8/2002 | Pruthi et al. | |
| 2002/0143971 A1 | 10/2002 | Govindarajan et al. | |
| 2002/0152319 A1 | 10/2002 | Amin et al. | |
| 2002/0176404 A1 | 11/2002 | Girard | |
| 2003/0016653 A1 | 1/2003 | Davis | |
| 2003/0033428 A1 | 2/2003 | Yadav | |
| 2003/0086515 A1 | 5/2003 | Trans et al. | |
| 2003/0120789 A1 | 6/2003 | Hepworth et al. | |
| 2003/0185217 A1 | 10/2003 | Ganti et al. | |
| 2003/0223431 A1 | 12/2003 | Chavez et al. | |
| 2003/0227878 A1 | 12/2003 | Krumm-Heller | |
| 2004/0073641 A1 | 4/2004 | Minhazuddin et al. | |
| 2004/0073690 A1 | 4/2004 | Hepworth et al. | |
| 2005/0058261 A1 | 3/2005 | Baumard | |
| 2005/0180323 A1 | 8/2005 | Beightol et al. | |
| 2005/0186933 A1 | 8/2005 | Trans | |
| 2005/0278148 A1 | 12/2005 | Bader et al. | |

FOREIGN PATENT DOCUMENTS

| | | |
|---|---|---|
| WO | WO 98/46035 | 10/1998 |
| WO | WO 99/51038 | 10/1999 |
| WO | WO 00/41090 | 7/2000 |
| WO | WO 01/26393 | 4/2001 |
| WO | WO 01/75705 | 10/2001 |
| WO | WO 02/00316 | 1/2002 |

OTHER PUBLICATIONS

Kathy Lynn Hewitt, Desktop Video Conferencing: A Low Cost and Scalable Solution to Distance. Education,"Chapter 2—Internet Conferencing Protocols" thesis submitted to North Carolina State University (1997), at http://www2.ncsu.edu/eos/service/ece.project/succeed_info/klhewitt/thesis/toc.html.

McCloghrie et al., "Structure of Policy Provisioning Information (SPPI)", RFC 3159, Aug. 2001, 38 pages.

PacketCable, Cable Labs, http://www.packetcable.com, copyright 2000-20021.

PacketCable TM Dynamic Quality-of-Service Specification PKT-SP-DQOS-102-000818, 2000, Cable Television Laboratories, Inc., 211 pages.

Peter Parnes, "Real-time Transfer Protocol (RTP)" (Sep. 8, 1997), at www.cdt.luth.se/~peppar/docs/lic/html/nodel66.html.

Schulzrinne. Providing Emergency Call Services for SIP-based Internet Telephony, http//www.softarmor.com/sipping/drafts/draft-schulzrinne-sip-911-00.txt., Jul. 13, 2000, pp. 1-13.

Wroclawski, "The use of RSVP with IETF Integrated Services", RFC 2210, Sep. 1997, 31 pages.

K. Nichols, Cisco Systems, RFC 2474, Definition of Differentiated Services Field in IPv4 & IPv6 Headers, Dec. 1998.

"Access for 9-1-1 and Telephone Emergency Services," American with Disabilities Act, U.S. Department of Justice (Jul. 15, 1998), available at http://www.usdoj.gov/crt/ada/911ta.htm, 11 pages.

Schulzrinne, "Emergency Call Services for SIP-based Internet Telephony," Internet Engineering Task Force (Mar. 25, 2001), pp. 1-17.

Le Boudec, Jean-Yves et al., slideshow entitled "Quality of Service in IP Networks (2)," Queue Management (undated), pp. 1-30.

RADVision, "SIP: Protocol Overview," (2001), pp. 1-16.

Application Note, Emergency 911 In Packet Networks, http:www.fastcomm.com/NewWeb/solutions/e911.html, Sep. 5, 2001, FastComm Communications Corporation, 3 pgs.

Baker (Editor), "Requirements for IP Version 4 Routers", RFC 1812, Jun. 1995, 175 pages.

Bernet et al., "Specification of the Null Service Type", RFC 2997, Nov. 2000, 12 pages.

Bernet, "Format of the RSVP DCLASS Object", RFC 2996, Nov. 2000, 9 pages.

Berney et al., "A Framework for Integrated Services Operation over Diffserv Networks", RFC 2998, Nov. 2000, 29 pages.

Braden et al. "Resource ReSerVation Protocol (RSVP)", RFC 2205, Sep. 1997, 6 pages.

Brown, 1. Internet Engineering Task Force, Securing Prioritised Emergency Traffic, http://www.iepscheme.net/docs/draft-brown-ieps-sec-00.txt, Jul. 5, 2001, pp. 1-12.

Carlberg, Ken. Internet Engineering Task Force, Framework for Supporting IEPS in IP Telephony, http://www.iepscheme.net/docs/draft-carlberg-ieps-framework-01.tex, Jul. 4, 2001, pp. 1-24.

Chan et al., "COPS Usage for Policy Provisioning (COPS-PR)", RFC 3084, Mar. 2001, 32 pages.

Cisco IP Phone 7960, eLearning Tutorial, at www.cisco.com/warp/public/779/largeent/avvid/products/7960/7960_show_using_help.htm, no date.

Cisco Systems, "Cisco Emergency Responder Version 1.1 Data Sheet" (10/01), 5 pages, copyright 1992-2001.

Floyd et al., "Random Early Detection Gateways for Congestion Avoidance", IEEE/ACM Transaction on Networking, Aug. 1993, 22 pages.

Getting Started with the Cisco IP Phone 7960/7940, pp. 1-1 to 1-4, no date.

Government Emergency Telecommunications Service (GETS), "White Paper on IP Teleponhy A Roadmap to Supporting GETS in IP Networks," Apr. 27, 2000, Science Applications International Corporation, pp. 1-32.

Grigonis, Computer Telephony Encyclopedia, pp. 268-277 (2000).

Handley et al., "SIP: Session Initiation Protocol", RFC 2543, Mar. 1999, 81 pages.

Herzog et al., "COPS Usage for RSVP", RFC 2749, Jan. 2000, 16 pages.

International Emergency Preference Scheme (IEPS), http://www.iepscheme.net/, Jun. 16, 2000, pp. 1-2

ITU, "Packet-based multimedia communications systems", H. 323, Feb. 1998, 125 pages.

Paul Roller Michaelis, "Speech Digililzation and Compression", *Int'l Encyclopedia of Ergonomic and Human Factors* (W. Warkowski ed., Taylor & Francis 2001).

Ejaz Mahfuz; "Packet Loss Concealment for Voice Transmission Over IP Networks" (2001) (Master thesis, Department of Electrical Engineering, McGill University) (on file with author).

International Telecommunication Union; "General Aspects of Digital Transmission System: Coding of Speech at 8kbit/s Using Conjugate-Structure Algebraic-Code-Excited Linear-Prediction" (CS-ACELP) ITU-T Recommendation G.729 (Mar. 1996).

Geeta Desal Chennubholla, "Embedded Systems: Rough start, but voice market growing," *EE Times*, at http://www.eetimes.com/in_focus/embedded_systems/EOG20020503S0067 (May 6, 2002).

Benjamin W. Wah, et al., "A Survey of Error-Concealment Schemes for Real-Time Audio and Video Transmissions over the Internet," Department of Electrical and Computer Engineering and the Coordinate Science Laboratory, University of Illinois at Urbana-Champaign, Proc. IEEE Ont'l Symposium on Multimedia Software Engineering, Dec. 2000.

International Engineering Consortium, "Silence Suppression and Comfort Noise Generation" at http://www.lec.org/online/tutorials/voice_qual/topic07.html (Jul. 1, 2002).

Tech Target, "voice activation detection," at http://searchnetworking.te...m/sDefinition/0,.sid7_gci342466.00.html (Jul. 1, 2002).

Hual-Rong Shao et al., "A New Framwork for Adaptive Multimedia over the Next Generation Internet," Microsoft Research China, no date.

"Packet Loss and Packet Loss Concealment Technical Brief," Nortel Networks at http://www.nortelnetworks.com (2000).

"Voice over packet: An assessment of voice performance on packet networks while paper," Nortel Networks, Publication No. 74007. 25/09-01, at http://www.nortelnetworks.com (2001).

"Telogy Networks' Voice Over Packet White Paper," Telogy Networks, Inc., available at http://www.telogy.com/our_products/golden_gateway/VOPwhite.html (Jan. 1998).

Sangeun Han et al., "Transmitting Scalable Video over a DiffServ network," EE368C Project Proposal (Jan. 30, 2001).

K. Nichols et al., "Definition of the Differentiated Services Field (DS Field) in the IPv4 and IPv6 Headers," Network Working Group, Category: Standards Track (Dec. 1999).

S. Blake et al., "An Architecture for Differentiated Services," Network Working Group, Category: Informational (Dec. 1998).

V. Jacobson et al., "An Expedited Forwarding PHB," Network Working Group, Category: Standards Track (Jun. 1999).

J. Heinanen et al., "Assured Forwarding PHB Group." Network Working Group, Category: Standards Track (Jun. 1999).

*IEEE Standards for Local and Metropolitan Area Networks: Virtual Bridged Local Area Networks.* The Institute of Electrical and Electronics Engineers, IEEE Std 802.1Q-1998 (Mar. 8, 1999).

\* cited by examiner

PACKET PRIORITIZATION AND ASSOCIATED BANDWIDTH AND BUFFER MANAGEMENT TECHNIQUES FOR AUDIO OVER IP

FIELD OF THE INVENTION

The present invention relates generally to audio communications over distributed processing networks and specifically to voice communications over data networks.

BACKGROUND OF THE INVENTION

Convergence of the telephone network and the Internet is driving the move to packet-based transmission for telecommunication networks. As will be appreciated, a "packet" is a group of consecutive bytes (e.g., a datagram in TCP/IP) sent from one computer to another over a network. In Internet Protocol or IP telephony or Voice Over IP (VoIP), a telephone call is sent via a series of data packets on a fully digital communication channel. This is effected by digitizing the voice stream, encoding the digitized stream with a codec, and dividing the digitized stream into a series of packets (typically in 20 millisecond increments). Each packet includes a header, trailer, and data payload of one to several frames of encoded speech. Integration of voice and data onto a single network offers significantly improved bandwidth efficiency for both private and public network operators.

In voice communications, high end-to-end voice quality in packet transmission depends principally on the speech codec used, the end-to-end delay across the network and variation in the delay (jitter), and packet loss across the channel. To prevent excessive voice quality degradation from transcoding, it is necessary to control whether and where transcodings occur and what combinations of codecs are used. End-to-end delays on the order of milliseconds can have a dramatic impact on voice quality. When end-to-end delay exceeds about 150 to 200 milliseconds one way, voice quality is noticeably impaired. Voice packets can take an endless number of routes to a given destination and can arrive at different times, with some arriving too late for use by the receiver. Some packets can be discarded by computational components such as routers in the network due to network congestion. When an audio packet is lost, one or more frames are lost too, with a concomitant loss in voice quality.

Conventional VoIP architectures have developed techniques to resolve network congestion and relieve the above issues. In one technique, voice activity detection (VAD) or silence suppression is employed to detect the absence of audio (or detect the presence of audio) and conserve bandwidth by preventing the transmission of "silent" packets over the network. Most conversations include about 50% silence. When only silence is detected for a specified amount of time, VAD informs the Packet Voice Protocol and prevents the encoder output from being transported across the network. VAD is, however, unreliable and the sensitivity of many VAD algorithms imperfect. To exacerbate these problems, VAD has only a binary output (namely silence or no silence) and in borderline cases must decide whether to drop or send the packet. When the "silence" threshold is set too low, VAD is rendered meaningless and when too high audio information can be erroneously classified as "silence" and lost to the listener. The loss of audio information can cause the audio to be choppy or clipped. In another technique, a receive buffer is maintained at the receiving node to provide additional time for late and out-of-order packets to arrive. Typically, the buffer has a capacity of around 150 milliseconds. Most but not all packets will arrive before the time slot for the packet to be played is reached. The receive buffer can be filled to capacity at which point packets may be dropped. In extreme cases, substantial, consecutive parts of the audio stream are lost due to the limited capacity of the receive buffer leading to severe reductions in voice quality. Although packet loss concealment algorithms at the receiver can reconstruct missing packets, packet reconstruction is based on the contents of one or more temporally adjacent packets which can be acoustically dissimilar to the missing packet(s), particularly when several consecutive packets are lost, and therefore the reconstructed packet(s) can have very little relation to the contents of the missing packet(s).

SUMMARY OF THE INVENTION

These and other needs are addressed by the various embodiments and configurations of the present invention. The present invention is directed generally to a computational architecture for efficient management of transmission bandwidth and/or receive buffer latency.

In one embodiment of the present invention, a transmitter for a voice stream is provided that comprises:

(a) a packet protocol interface operable to convert one or more selected segments (e.g., frames) of the voice stream into a packet and (b) an acoustic prioritization agent operable to control processing of the selected segment and/or packet based on one or more of (i) a level of confidence that the contents of the selected segment are not the product of voice activity (e.g., are silence), (ii) a type of voice activity (e.g., plosive) associated with or contained in the contents of the selected segment, and (iii) a degree of acoustic similarity between the selected segment and another segment of the voice stream.

The level of confidence permits the voice activity detector to provide a ternary output as opposed to the conventional binary output. The prioritization agent can use the level of confidence in the ternary output, possibly coupled with one or measures of the traffic patterns on the network, to determine dynamically whether or not to send the "silent" packet and, if so, use a lower transmission priority or class for the packet.

The type of voice activity permits the prioritization agent to identify extremely important parts of the voice stream and assign a higher transmission priorities and/or class to the packet(s) containing these parts of the voice stream. The use of a higher transmission priority and/or class can significantly reduce the likelihood that the packet(s) will arrive late, out of order, or not at all.

The comparison of temporally adjacent packets to yield a degree of acoustic similarity permits the prioritization agent to control bandwidth effectively. The agent can use the degree of similarity, possibly coupled with one or measures of the traffic patterns on the network, to determine dynamically whether or not to send a "similar" packet and, if so, use a lower transmission priority or class for the packet. Packet loss concealment algorithms at the receiver can be used to reconstruct the omitted packet(s) to form a voiced signal that closely matches the original signal waveform. Compared to conventional transmission devices, fewer packets can be sent over the network to realize an acceptable signal waveform.

In another embodiment of the present invention, a receiver for a voice stream is provided that comprises:

(a) a receive buffer containing a plurality of packets associated with voice communications; and (b) a buffer manager operable to remove some of the packets from the receive buffer while leaving other packets in the receive buffer based on a level of importance associated with the packets.

In one configuration, the level of importance of the each of the packets is indicated by a corresponding value marker. The level of importance or value marker can be based on any suitable criteria, including a level of confidence that contents of the packet contain voice activity, a degree of similarity of temporally adjacent packets, the significance of the audio in the packet to receiver understanding or fidelity, and combinations thereof.

In another configuration, the buffer manager performs time compression around the removed packet(s) to prevent reconstruction of the packets by the packet loss concealment algorithm. This can be performed by, for example, resetting a packet counter indicating an ordering of the packets, such as by assigning the packet counter of the removed packet to a packet remaining in the receive buffer.

In another configuration, the buffer manager only removes packet(s) from the buffer when the buffer delay or capacity equals or exceeds a predetermined level. When the buffer is not in an overcapacity situation, it is undesirable to degrade the quality of voice communications, even if only slightly.

The various embodiments of the present invention can provide a number of advantages. First, the present invention can decrease substantially network congestion by dropping unnecessary packets, thereby providing lower end-to-end delays across the network, lower degrees of variation in the delay (jitter), and lower levels of packet loss across the channel. Second, the various embodiments of the present invention can handle effectively the bursty traffic and best-effort delivery problems commonly encountered in conventional networks while maintaining consistently and reliably high levels of voice quality reliably. Third, voice quality can be improved relative to conventional voice activity detectors by not discarding "silent" packets in borderline cases.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
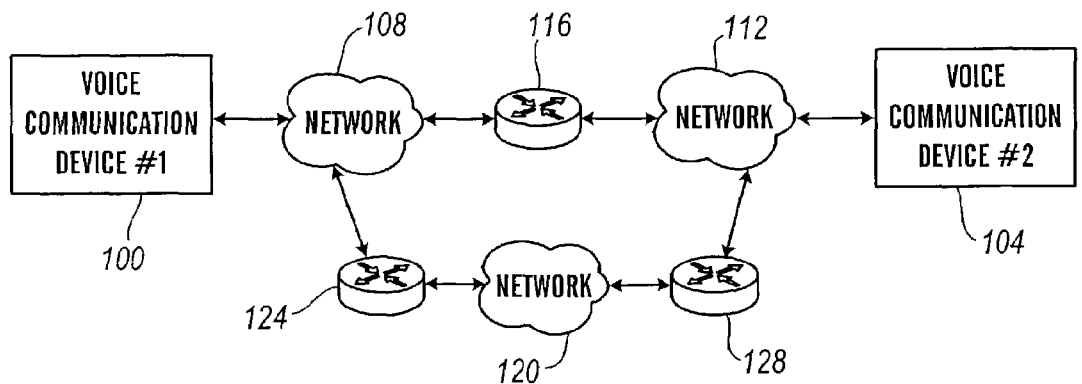
FIG. 1 is a block diagram of a simple network for a VoIP session between two endpoints according to a first embodiment of the present invention.

FIG. 1 is a simplistic VoIP network architecture according to a first embodiment of the present invention. First and second voice communication devices 100 and 104 transmit and receive VoIP packets. The packets can be transmitted over one of two paths. The first and shortest path is via networks 108 and 112 and router 116. The second and longer path is via networks 108, 112, and 120 and routers 124 and 128. Depending upon the path followed, the packets can arrive at either of the communication devices at different times. As will be appreciated, network architectures suitable for the present invention can include any number of networks and routers and other intermediate nodes, such as transcoding gateways, servers, switches, base transceiver stations, base station controllers, modems, router, and multiplexers and employ any suitable packet-switching protocols, whether using connection oriented or connectionless services, including without limitation Internet Protocol or IP, Ethernet, and Asynchronous Transfer Mode or ATM.

As will be further appreciated, the first and second voice communication devices 100 and 104 can be any communication devices configured to transmit and/or receive packets over a data network, such as the Internet. For example, the voice communication devices 100 and 104 can be a personal computer, a laptop computer, a wired analog or digital telephone, a wireless analog or digital telephone, intercom, and radio or video broadcast studio equipment.

Figure 2:
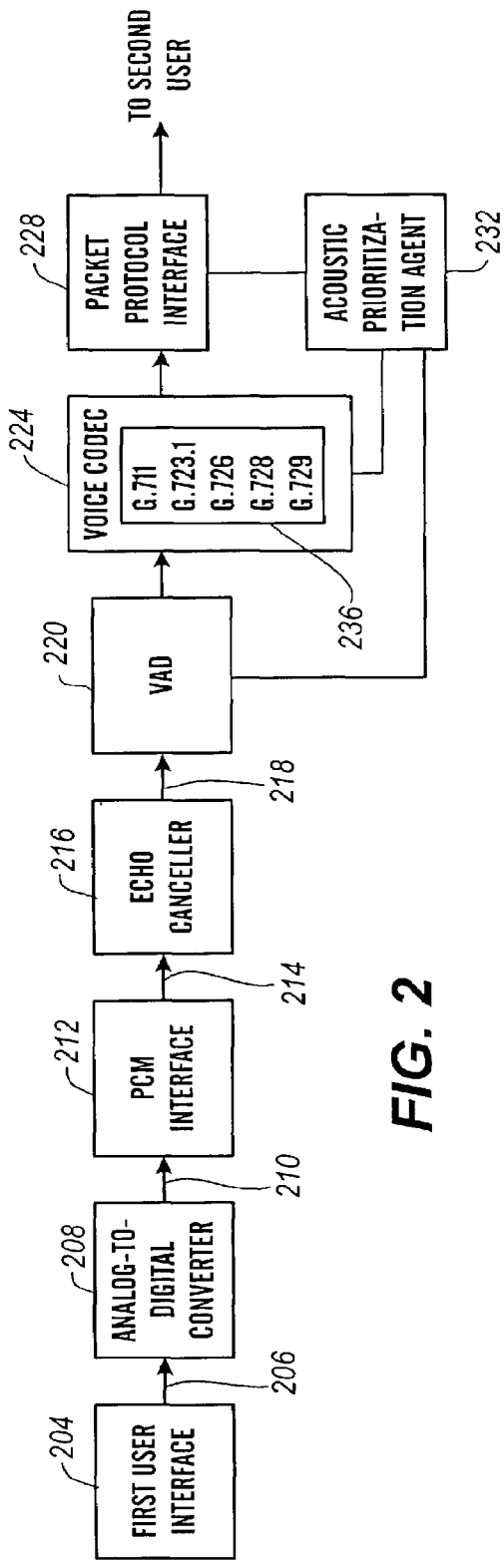
FIG. 2 is a block diagram of the functional components of a transmitting voice communication device according to the first embodiment.

FIG. 2 depicts an embodiment of a transmitting voice communication device. The device 200 includes, from left to right, a first user interface 204 for outputting signals inputted by the first user (not shown) and an outgoing voice stream 206 received from the first user, an analog-to-digital converter 208, a Pulse Code Modulation or PMC interface 212, an echo canceller 216, a Voice Activity Detector or VAD 220, a voice codec 224, a packet protocol interface 228 and an acoustic prioritizing agent 232.

The first user interface 204 is conventional and be configured in many different forms depending upon the particular implementation. For example, the user interface 204 can be configured as an analog telephone or as a PC.

The analog-to-digital converter 208 converts, by known techniques, the analog outgoing voice stream 206 received from the first user interface 204 into an outgoing digital voice stream 210.

The PCM interface 212, inter alia, forwards the outgoing digital voice stream 210 to appropriate downstream processing modules for processing.

The echo canceller 216 performs echo cancellation on the digital stream 214, which is commonly a sampled, full-duplex voice port signal. Echo cancellation is preferably G. 165 compliant.

The VAD 220 monitors packet structures in the incoming digital voice stream 216 received from the echo canceller 216 for voice activity. When no voice activity is detected for a configurable period of time, the VAD 220 informs the acoustic prioritizing agent 232 of the corresponding packet structure(s) in which no voice activity was detected and provides a level of confidence that the corresponding packet structure(s) contains no meaningful voice activity. This output is typically provided on a packet structure-by-packet structure basis. These operations of the VAD are discussed below with reference to FIG. 4.

VAD 220 can also measure the idle noise characteristics of the first user interface 204 and report this information to the packet protocol interface 228 in order to relay this information to the other voice communication device for comfort noise generation (discussed below) when no voice activity is detected.

The voice codec 224 encodes the voice data in the packet structures for transmission over the data network and compares the acoustic information (each frame of which includes spectral information such as sound or audio amplitude as a function of frequency) in temporally adjacent packet structures and assigns to each packet an indicator of the difference between the acoustic information in adjacent packet structures. These operations are discussed below with reference to FIG. 5. As shown in box 236, the voice codec typically include, in memory, numerous voice codecs capable of different compression ratios. Although only codecs G.711, G,723.1, G.726, G.728, and G.729 are shown, it is to be understood that any voice codec whether known currently or developed in the future could be in memory. Voice codecs encode and/or compress the voice data in the packet structures. For example, a compression of 8:1 is achievable with the G.729 voice codec (thus the normal 64 Kbps PCM signal is transmitted in only 8 Kbps). The encoding functions of codecs are further described in Michaelis, *Speech Digitization and Compression*, in the *International Encyclopedia of Ergonomics and Human Factors*, edited by Warkowski, 2001; ITU-T Recommendation G.729 *General Aspects of Digital Transmission Systems, Coding of Speech at 8 kbit/s using Conjugate-Structure Algebraic-Code-Excited Linear-Prediction*, March 1996; and Mahfuz, *Packet Loss Concealment for Voice Transmission Over IP Networks*, September 2001, each of which is incorporated herein by this reference.

The prioritization agent 232 efficiently manages the transmission bandwidth and the receive buffer latency. The prioritization agent (a) determines for each packet structure, based on the corresponding difference in acoustic information between the selected packet structure and a temporally adjacent packet structure (received from the codec), a relative importance of the acoustic information contained in the selected packet structure to maintaining an acceptable level of voice quality and/or (b) determines for each packet structure containing acoustic information classified by the VAD 220 as being "silent" a relative importance based on the level of confidence (output by the VAD for that packet structure) that the acoustic information corresponds to no voice activity. The acoustic prioritization agent, based on the differing levels of importance, causes the communication device to process differently the packets corresponding to the packet structures. The packet processing is discussed in detail below with reference to FIG. 6.

Figure 3:
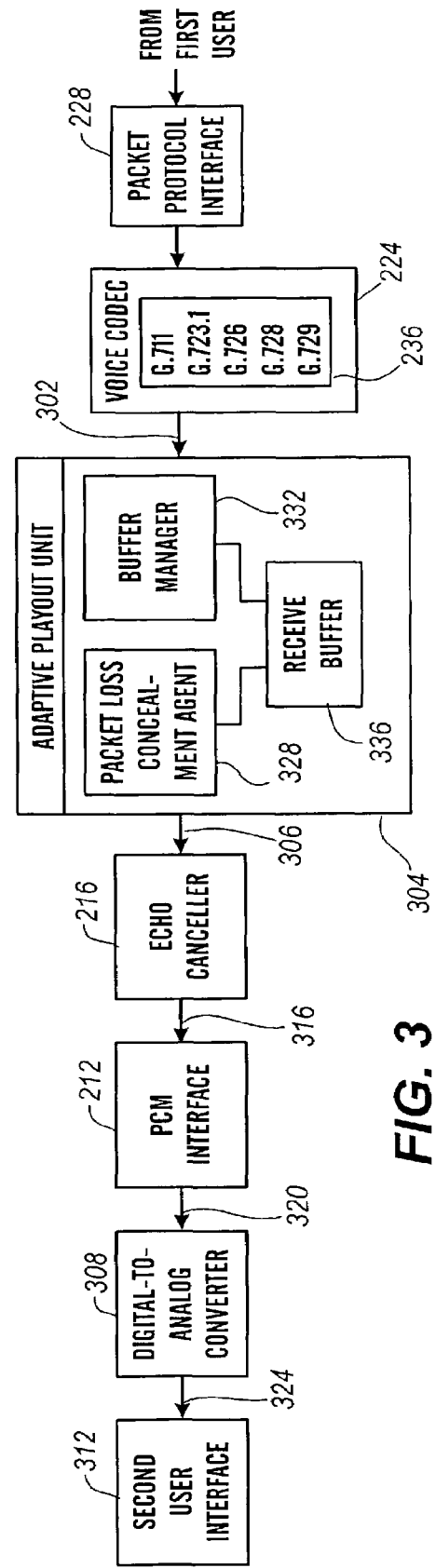
FIG. 3 is a block diagram of the functional components of a receiving voice communication device according to the first embodiment.

The packet protocol interface 228 assembles into packets and sequences the outgoing encoded voice stream and configures the packet headers for the various protocols and/or layers required for transmission to the second voice communication device 300 (FIG. 3). Typically, voice packetization protocols use a sequence number field in the transmit packet stream to maintain temporal integrity of voice during playout. Under this approach, the transmitter inserts apacket counter, such as the contents of a free-running, modulo-16 packet counter, into each transmitted packet, allowing the receiver to detect lost packets and properly reproduce silence intervals during playout at the receiving communication device. In one configuration, the importance assigned by the acoustic prioritizing agent can be used to configure the fields in the header to provide higher or lower transmission priorities. This option is discussed in detail below in connection with FIG. 6.

The packetization parameters, namely the packet size and the beginning and ending points of the packet are communicated by the packet protocol interface 228 to the VAD 220 and codec 224 via the acoustic prioritization agent 232. The packet structure represents the portion of the voice stream that will be included within a corresponding packet's payload. In other words, a one-to-one correspondence exists between each packet structure and each packet. As will be appreciated, it is important that packetization parameter synchronization be maintained between these components to maintain the integrity of the output of the acoustic prioritization agent.

FIG. 3 depicts an embodiment of a receiving (or second) voice communication device 300. The device 300 includes, from right to left, the packet protocol interface 228 to remove the header information from the packet payload, the voice codec 224 for decoding and/or decompressing the received packet payloads to form an incoming digital voice stream 302, an adaptive playout unit 304 to process the received packet payloads, the echo canceller 216 for performing echo cancellation on the incoming digital voice stream 306, the PCM interface 212 for performing continuous phase resampling of the incoming digital voice stream 316 to avoid sample slips and forwarding the echo cancelled incoming voice stream 316 to a digital-to-analog converter 308 that converts the echo cancelled incoming voice stream 320 into an analog voice stream 324, and second user interface 312 for outputting to the second user the analog voice stream 324.

The adaptive playout unit 304 includes apacket loss concealment agent 328, a receive buffer 336, and a receive buffer manager 332. The adaptive playout unit 304 can further include a continuous-phase resampler (not shown) that removes timing frequency offset without causing packet slips or loss of data for voice or voiceband modem signals and a timing jitter measurement module (not shown) that allows adaptive control of FIFO delay.

The packet loss concealment agent 328 reconstructs missing packets based on the contents of temporally adjacent received packets. As will be appreciated, the packet loss concealment agent can perform packet reconstruction in a multiplicity of ways, such as replaying the last packet in place of the lost packet and generating synthetic speech using a circular history buffer to cover the missing packet. Preferred packet loss concealment algorithms preserve the spectral characteristics of the speaker's voice and maintain a smooth transition between the estimated signal and the surrounding original. In one configuration, packet loss concealment is performed by the codec.

The receive buffer 336 alleviates the effects of late packet arrival by buffering received voice packets. In most applications the receive buffer 336 is a First-In-First-Out or FIFO buffer that stores voice codewords before playout and removes timing jitter from the incoming packet sequence. As will be appreciated, the buffer 336 can dynamically increase and decrease in size as required to deal with late packets when the network is uncongested while avoiding unnecessary delays when network traffic is congested.

The buffer manager 332 efficiently manages the increase in latency (or end-to-end delay) introduced by the receive buffer 336 by dropping (low importance) enqueued packets as set forth in detail below in connection with FIGS. 7 and 8.

In addition to packet payload decryption and/or decompression, the voice codec 228 can also include a comfort noise generator (not shown) that, during periods of transmit silence when no packets are sent, generates a local noise signal that is presented to the listener. The generated noise attempts to match the true background noise. Without comfort noise, the listener can conclude that the line has gone dead.

Analog-to-digital and digital-to-analog converters 208 and 308, the pulse code modulation interface 212, the echo canceller 216a and b, packet loss concealment agent 328, and receive buffer 336 are conventional.

Although FIGS. 2 and 3 depict voice communication devices in simplex configurations, it is to be understood that each of the voice communication devices 200 and 300 can act both as a transmitter and receiver in a duplexed configuration.

Figure 4:
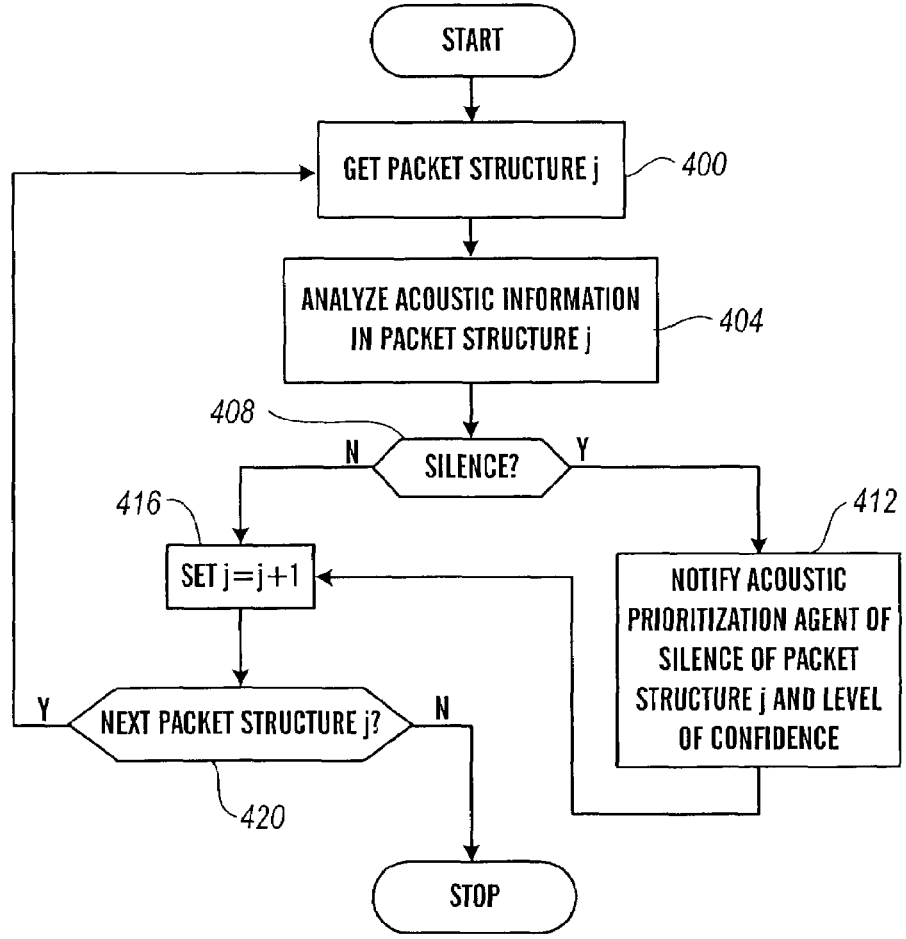
FIG. 4 is a flow chart of a voice activity detector according to a second embodiment of the present invention.

The operation of the VAD 220 will now be described with reference to FIGS. 2 and 4.

In the first step 400, the VAD 220 gets packet structure from the echo canceled digital voice stream 218. Packet structure counter i is initially set to one. In step 404, the VAD 220 analyzes the acoustic information in packet structure$_j$ to identify by known techniques whether or not the acoustic information qualifies as "silence" or "no silence" and determine a level of confidence that the acoustic information does not contain meaningful or valuable acoustic information. The level of confidence can be determined by known statistical techniques, such as energy level measurement, least mean square adaptive filter (Widrow and Hoff 1959), and other Stochastic Gradient Algorithms. In one configuration, the acoustic threshold(s) used to categorize frames or packets as "silence" versus "nonsilence" vary dynamically, depending upon the traffic congestion of the network. The congestion of the network can be quantified by known techniques, such as by jitter determined by the timing measurement module (not shown) in the adaptive playout unit of the sending or receiving communication device, which would be forwarded to the VAD 220. Other selected parameters include latency or end-to-end delay, number of lost or dropped packets, number of packets received out-of-order, processing delay, propagation delay, and receive buffer delay/length. When the selected parameter(s) reach or fall below selected levels, the threshold can be reset to predetermined levels.

In step 408, the VAD 220 next determines whether or not packet structure$_j$, is categorized as "silent" or "nonsilent". When packet structure$_j$ is categorized as being "silent", the VAD 220, in step 412, notifies the acoustic prioritization agent 232 of the packet structure$_j$ beginning and/or endpoint(s), packet length, the "silent" categorization of packet structure$_j$, and the level of confidence associated with the "silent" categorization of packet structure$_j$. When packet structure$_j$ is categorized as "nonsilent" or after step 412, the VAD 220 in step 416 sets counter j equal to j+1 and in step 420 determines whether there is a next packet structure$_j$. If so, VAD 220 returns to and repeats step 400. If not, VAD 220 terminates operation until a new series of packet structures is received.

Figure 5:
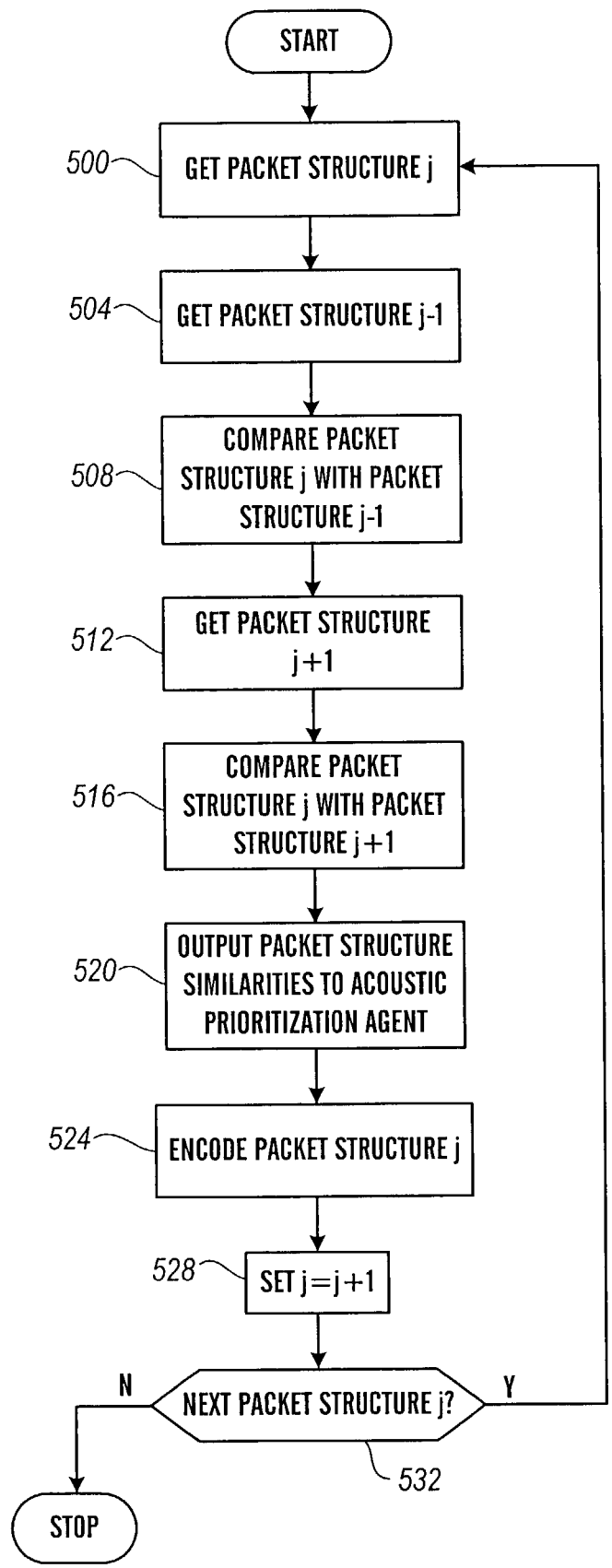
FIG. 5 is a flow chart of a codec according to a third embodiment of the present invention.

The operation of the codec 224 will now be described with reference to FIGS. 2 and 5. In steps 500, 504 and 512, respectively, the codec 224 gets packet structure$_j$, packet structure$_{j-1}$, and packet structure$_{j+1}$. Packet structure counter j is, of course, initially set to one.

In steps 508 and 516, respectively, the codec 224 compares packet structure$_j$ with packet structure$_{j-1}$, and packet structure$_j$, with packet structure$_{j+1}$. As will be appreciated, the comparison can be done by any suitable technique, either currently or in the future known by those skilled in the art. For example, the amplitude and/or frequency waveforms (spectral information) formed by the collective frames in each packet can be mathematically compared and the difference(s) quantified by one or more selected measures or simply by a binary output such as "similar" or "dissimilar". Acoustic comparison techniques are discussed in Michaelis, et a., *A Human Factors Engineer's Introduction to Speech Synthesizers*, in *Directions in Human-Computer Interaction*, edited by Badre, et al., 1982, which is incorporated herein by this reference. If a binary output is employed, the threshold selected for the distinction between "similar" and "dissimilar" can vary dynamically based on one or more selected measures or parameters of network congestion. Suitable measures or parameters include those set forth previously. When the measures increase or decrease to selected levels the threshold is varied in a predetermined fashion.

In step 520, the codec 224 outputs the packet structure similarities/nonsimilarities determined in steps 508 and 516 to the acoustic prioritization agent 232. Although not required, the codec 224 can further provide a level of confidence regarding the binary output. The level of confidence can be determined by any suitable statistical techniques, including those set forth previously. Next in step 524, the codec encodes packet structure$_j$. As will be appreciated, the comparison steps 508 and 516 and encoding step 524 can be conducted in any order, including in parallel. The counter is incremented in step 528, and in step 532, the codec determines whether or not there is a next packet structure$_j$.

The operation of the acoustic prioritization agent 232 will now be discussed with reference to with FIGS. 2 and 6.

In step 600, the acoustic prioritizing agent 232 gets packet$_j$ (which corresponds to packet structure$_j$). In step 604, the agent 232 determines whether VAD 220 categorized packet structure$_j$ as "silence". When the corresponding packet structure$_j$ has been categorized as "silence", the agent 232, in step 608, processes packet$_j$ based on the level of confidence reported by the VAD 220 for packet structure$_j$.

The processing of "silent" packets can take differing forms. In one configuration, a packet having a corresponding level of confidence less than a selected silence threshold Y is dropped. In other words, the agent requests the packet protocol interface 228 to prevent packet$_j$ from being transported across the network. A "silence" packet having a corresponding level of confidence more than the selected threshold is sent. The priority of the packet can be set at a lower level than the priorities of "nonsilence" packets. "Priority" can take many forms depending on the particular protocols and network topology in use. For example, priority can refer to a service class or type (for protocols such as Differentiated Services and Internet Integrated Services), and priority level (for protocols such as Ethernet). For example, "silent" packets can be sent via the assured forwarding class while "nonsilence" packets are sent via the expedited forwarding (code point) class. This can be done, for example, by suitably marking, in the Type of Service or Traffic Class fields, as appropriate. In yet another configuration, a value marker indicative of the importance of the packet to voice quality is placed in the header and/or payload of the packet. The value marker can be used by intermediate nodes, such as routers, and/or by the buffer manager 332 (FIG. 3) to discard packets in appropriate applications. For example, when traffic congestion is found to exist using any of the parameters set forth above, value markers having values less than a predetermined level can be dropped during transit or after reception. This configuration is discussed in detail with reference to FIGS. 7 and 8. Multiple "silence"

packet thresholds can be employed for differing types of packet processing, depending on the application. As will be appreciated, the various thresholds can vary dynamically depending on the degree of network congestion as set forth previously.

When the corresponding packet structure$_j$ has been categorized as "nonsilence", the agent 232, in step 618, determines whether the degree of similarity between the corresponding packet structure$_j$ and packet structure$_{j-1}$ (as determined by the codec 224) is greater than or equal to a selected similarity threshold X. If so, the agent 232 proceeds to step 628 (discussed below). If not, the agent 232 proceeds to step 624. In step 624, the agent determines whether the degree of similarity between the corresponding packet structure$_j$ and packet structure$_{j+}$ (as determined by the codec 224) is greater than or equal to the selected similarity threshold X. If so, the agent 232 proceeds to step 628.

In step 628, the agent 232 processes packet$_j$ based on the magnitude of the degree of similarity and/or on the treatment of the temporally adjacent packet$_{j-}$. As in the case of "silent" packets, the processing of similar packets can take differing forms. In one configuration, a packet having a degree of similarity more than the selected similarity threshold X is dropped. In other words, the agent requests the packet protocol interface 228 to prevent packet$_j$ from being transported across the network. The packet loss concealment agent 328 (FIG. 3) in the second communication device 300 will reconstruct the dropped packet. In that event, the magnitude of X is determined by the packet reconstruction efficiency and accuracy of the packet loss concealment algorithm. If the preceding packet$_{j-}$ were dropped, packet$_j$ may be forwarded, as the dropping of too many consecutive packets can have a detrimental impact on the efficiency and accuracy of the packet loss concealment agent 328. In another configuration, multiple transmission priorities are used depending on the degree of similarity. For example, a packet having a degree of similarity more than the selected threshold is sent with a lower priority. The priority of the packet is set at a lower level than the priorities of dissimilar packets. As noted above, "priority" can take many forms depending on the particular protocols and network topology in use. In yet another configuration, the value marker indicative of the importance of the packet to voice quality is placed in the header and/or payload of the packet. The value marker can be used as set forth previously and below to cause the dropping of packets having value markers below one or more selected marker value thresholds. Multiple priority levels can be employed for multiple similarity thresholds, depending on the application. As will be appreciated, the various similarity and marker value thresholds can vary dynamically depending on the degree of network congestion as set forth previously.

After steps 608 and 628 and in the event in step 624 that the similarity between the corresponding packet structure$_j$ and packet structure$_{j+1}$, (as determined by the codec 224) is less than the selected similarity threshold X, the agent 232 proceeds to step 612. In step 612, the counter j is incremented by one. In step 616, the agent 232 determines whether there is a next packet$_j$. When there is a next packet$_j$, the agent 232 proceeds to and repeats step 600. When there is no next packet$_j$, the agent 232 proceeds to step 632 and terminates operation until more packet structures are received for packetization.

The operation of the buffer manager 332 will now be described with reference to FIGS. 3 and 7-8. In step 800, the buffer manager 332 determines whether the buffer delay (or length) is greater than or equal to a buffer threshold Y. If not, the buffer manager 332 repeats step 800. If so, the buffer manager 332 in step 804 gets packet$_k$ from the receive buffer 336. Initially, of course the counter k is set to 1 to denote the packet in the first position in the receive buffer (or at the head of the buffer). Alternatively, the manager 332 can retrieve the last packet in the receive buffer (or at the tail of the buffer).

In step 808, the manager 332 determines if the packet is expendable; that is, whether the value of the value marker is less than (or greater depending on the configuration) a selected value threshold. When the value of the value marker is less than the selected value threshold, the packet$_k$ in step 812 is discarded or removed from the buffer and in step 816 the surrounding enqueued packets are time compressed around the slot previously occupied by packet$_k$.

Figure 7:
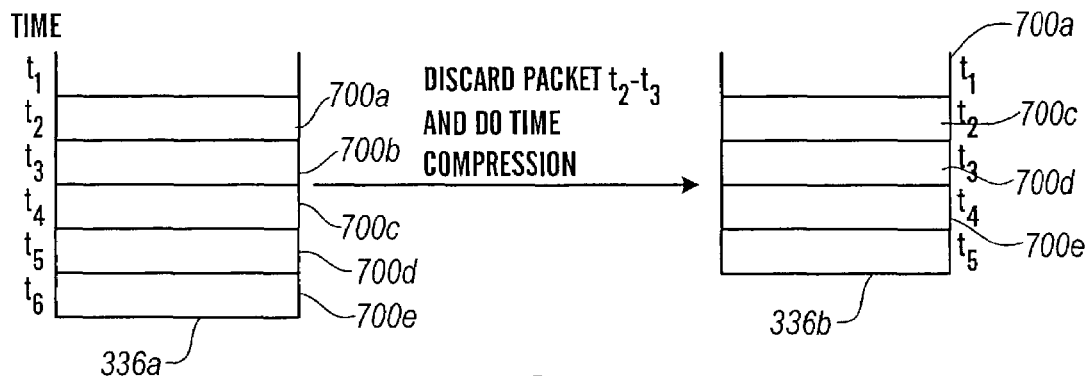
FIG. 7 is a block diagram illustrating time compression according to a fourth embodiment of the present invention.

Time compression is demonstrated with reference to FIG. 7. The buffer 336 is shown as having various packets 700$a$-$e$, each packet payload representing a corresponding time interval of the voice stream. If the manager determines that packet 700$b$ (which corresponds to the time interval $t_2$ to $t_3$) is expendable, the manager 332 first removes the packet 700$b$ from the queue 336$a$ and then moves packets 700$c$-$e$ ahead in the queue. To perform time compression, the packet counters for packets 700$c$-$e$ are decremented such that packet 700$c$ now occupies the time slot $t_2$ to $t_3$, packet 700$d$ time slot $t_2$ to $t_3$, and packet 700$d$ time slot $t_3$ to $t_4$. In this manner, the packet loss concealment agent 328 will be unaware that packet 700$b$ has been discarded and will not attempt to reconstruct the packet. In contrast, if a packet is omitted from an ordering of packets, the packet loss concealment agent 328 will recognize the omission by the break in the packet counter sequence. The agent 328 will then attempt to reconstruct the packet.

Returning again to FIG. 8, the manager 332 in step 820 increments the counter k and repeats step 800 for the next packet.

A number of variations and modifications of the invention can be used. It would be possible to provide for some features of the invention without providing others.

For example in one alternative embodiment, the prioritizing agent's priority assignment based on the type of "silence" detected can be performed by the VAD 200.

In another alternative embodiment though FIG. 2 is suitable for use with a VoIP architecture using Embedded Communication Objects interworking with a telephone system and packet network, it is to be understood that the configuration of the VAD 220, codec 224, prioritizing agent 232 and/or buffer manager 332 of the present invention can vary significantly depending upon the application and the protocols employed. For example, the prioritizing agent 232 can be included in an alternate location in the embodiment of FIG. 2, and the buffer manager in an alternate location in the embodiment of FIG. 3. The prioritizing agent and/or buffer manager can interface with different components than those shown in FIG. 2 for other types of user interfaces, such as a PC, wireless telephone, and laptop. The prioritizing agent and/or buffer manager can be included in an intermediate node between communication devices, such as in a switch, transcoding device, translating device, router, gateway, etc.

In another embodiment, the packet comparison operation of the codec is performed by another component. For example, the VAD and/or acoustic prioritization agent performs these functions.

In another embodiment, the level of confidence determination of the VAD is performed by another component. For example, the codec and/or acoustic prioritization agent performs these functions.

In yet a further embodiment, the codec and/or VAD, during packet structure processing attempt to identify acoustic events of great importance, such as plosives. When such acoustic events are identified (e.g., when the difference identified by the codec exceeds a predetermined threshold), the acoustic prioritizing agent 232 can cause the packets corresponding to the packet structures to have extremely high priorities and/or be marked with value markers indicating that the packet is not to be dropped under any circumstances. The loss of a packet containing such important acoustic events often cannot be reconstructed accurately by the packet loss concealment agent 328.

In yet a further embodiment, the analyses performed by the codec, VAD, and acoustic prioritizing agent are performed on a frame level rather than a packet level. "Silent" frames and/or acoustically similar frames are omitted from the packet payloads. The procedural mechanisms for these embodiments are similar to that for packets in FIGS. 4 and 5. In fact, the replacement of "frame" for "packet structure" and "packet" in FIGS. 4 and 5 provides a configuration of this embodiment.

Figure 6:
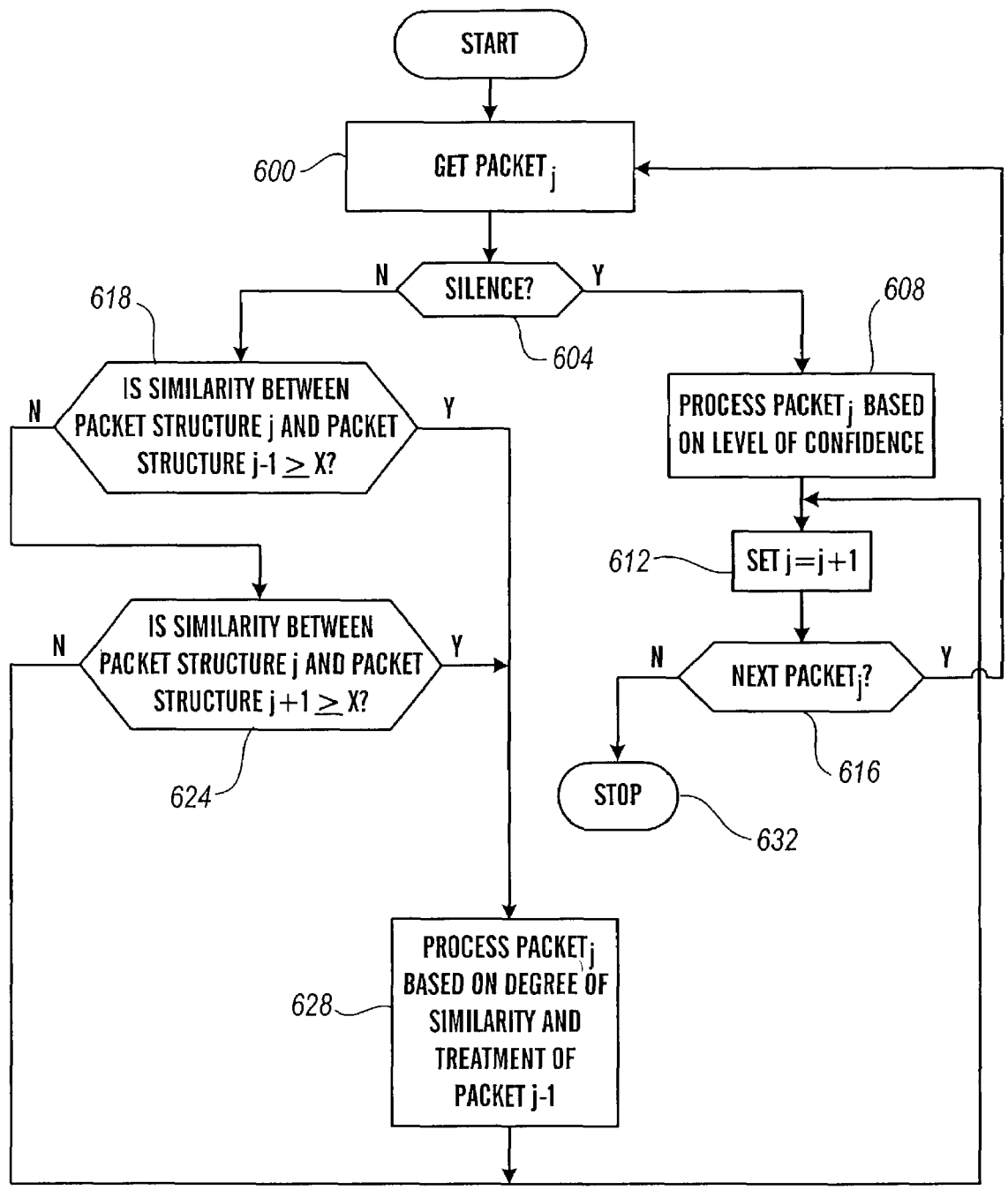
FIG. 6 is a flow chart of a packet prioritizing algorithm according to a second embodiment of the present invention.
Figure 8:
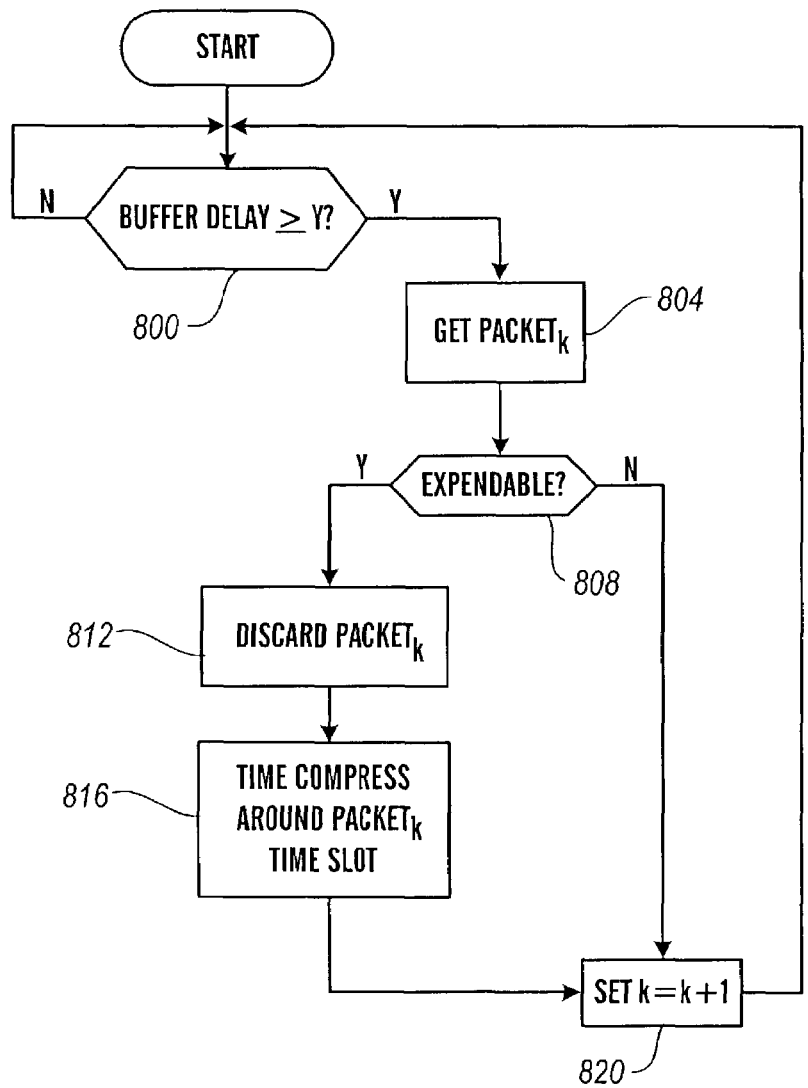
FIG. 8 is a flow chart of a buffer management algorithm according to the fourth embodiment of the present invention.

In yet another embodiment, the algorithms of FIGS. 6 and 8 are state driven. In other words, the algorithms are not triggered until network congestion exceeds a predetermined amount. The trigger for the state to be entered can be based on any of the performance parameters set forth above increasing above or decreasing below predetermined thresholds.

In yet a further embodiment, the dropping of packets based on the value of the value marker is performed by an intermediate node, such as a router. This embodiment is particularly useful in a network employing any of the Multi Protocol Labeling Switching, ATM, and Integrated Services Controlled Load and Differentiate Services.

In yet a further embodiment, the positions of the codec and adaptive playout unit in FIG. 3 are reversed. Thus, the receive buffer 336 contains encoded packets rather than decoded packets.

In yet a further embodiment, the acoustic prioritization agent 232 processes packet structures before and/or after encryption.

In yet a further embodiment, a value marker is not employed and the buffer manager itself performs the packet/frame comparison to identify acoustically similar packets that can be expended in the event that buffer length/delay reaches undesired levels.

In other embodiments, the VAD 220, codec 224, acoustic prioritization agent 232, and/or buffer manager 332 are implemented as software and/or hardware, such as a logic circuit, e.g., an Application Specific Integrated Circuit or ASIC.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for processing voice communications over a data network, comprising:
    (a) receiving a voice stream from a user, the voice stream comprising a plurality of temporally distinct segments; and
    (b) processing at least first, second and third segments of the voice stream according to the following substeps:
        (i) selecting the first segment, wherein the contents of the selected first segment are not product of voice activity;
        (ii) determining that the contents of the selected first segment are not the product of voice activity;
        (iii) determining a level of confidence that the voice activity determination for the selected first segment is accurate;
        (iv) when the level of confidence is one of less than and greater than a predetermined threshold, not transmitting the selected first segment to a selected endpoint;
        (v) selecting the second segment, wherein the contents of the selected second segment are the product of voice activity and wherein the second and third segments are temporally adjacent to one another;
        (vi) determining that the contents of the selected segment are the product of voice activity;
        (vii) comparing the selected second segment with the third segment to determine a degree of acoustic similarity between the second and third segments; and
        (viii) when the selected second segment is similar to the third segment, at least one of not transmitting the selected second segment to the selected endpoint and dropping the second segment during transmission.

2. The method of claim 1, further comprising:
    (c) selecting a fourth segment of the voice stream;
    (d) determining that the contents of the fourth segment are not the product of voice activity;
    (e) determining a level of confidence that the voice activity determination for the selected fourth segment is accurate;
    (f) determining that the level of confidence is the other of less than and greater than the predetermined threshold;
    (g) assigning an importance to the fourth segment.

3. The method of claim 2, wherein the importance is a value marker and further comprising:
    incorporating the value marker into a packet comprising the fourth segment.

4. The method of claim 3, further comprising:
when the value of the value marker is one of less than and greater than a predetermined value threshold, removing the packet from a receive buffer.

5. The method of claim 2, wherein the importance is a service class assigned to a packet comprising the fourth segment.

6. The method of claim 2, wherein the importance is a transmission priority assigned to a packet comprising the fourth segment.

7. The method of claim 2, further comprising:
(h) when packet traffic congestion is determined to exist, dropping packets having value markers less than a predetermined level.

8. The method of claim 7, further comprising:
varying the predetermined threshold based on at least one of jitter, latency, a number of missing packets, a number of packets received out-of-order, a processing delay, a propagation delay, a receive buffer delay, and a number of packets enqueued in a receive buffer.

9. The method of claim 1, further comprising:
(ix) when the selected second segment is not similar to the third segment, transmitting the selected second segment to the selected endpoint and not dropping the second segment during transmission.

10. The method of claim 1, further comprising the substep:
(ix) assigning an importance to the second segment, wherein the level of importance is at least one of a transmission priority of a packet comprising the second segment and a value marker to be included in the packet.

11. The method of claim 10, wherein the third segment temporally precedes the second segment and a fourth segment temporally follows the second segment and wherein substep (iv) comprises:
comparing the second segment with the third segment of the voice stream to determine a first degree of acoustic similarity between the second and third segments; and
comparing the second segment with the fourth segment of the voice stream to determine a second degree of acoustic similarity between the second and fourth segments.

12. The method of claim 11, wherein the processing step is based on at least one of the first and second degrees of acoustic similarity one of exceeding or being less than a selected similarity threshold.

13. The method of claim 10, wherein a first packet associated with the first segment is not transmitted and further comprising:
later reconstructing the first segment with a packet loss concealment algorithm.

14. The method of claim 1, wherein the first and second segments correspond to a payload of a first packet.

15. The method of claim 1, wherein the first segment corresponds to a frame of a first packet and the second segment to a frame of a second packet.

16. The method of claim 1, wherein different classes of services are used for different segments of the voice stream.

17. The method of claim 1, wherein different transmission priorities are used for different segments of the voice stream.

18. The method of claim 1, wherein the first and third segments are temporally adjacent to the second segment.

19. The method of claim 18, further comprising:
determining a type of voice activity associated with the contents of the second segment, wherein the type of voice activity is a plosive.

20. A computer readable circuit containing processor executable instructions to perform steps comprising:
(a) receiving a voice stream from a user, the voice stream comprising a plurality of temporally distinct segments; and
(b) processing at least first, second and third segments of the voice stream according to the following substeps:
(i) selecting the first segment, wherein the contents of the selected first segment are not product of voice activity;
(ii) determining that the contents of the selected first segment are not the product of voice activity;
(iii) determining a level of confidence that the voice activity determination for the selected first segment is accurate;
(iv) when the level of confidence is one of less than and greater than a predetermined threshold, not transmitting the selected first segment to a selected endpoint;
(v) selecting the second segment, wherein the contents of the selected second segment are the product of voice activity and wherein the second and third segments are temporally adjacent to one another;
(vi) determining that the contents of the selected segment are the product of voice activity;
(vii) comparing the selected second segment with the third segment to determine a degree of acoustic similarity between the second and third segments; and
(viii) when the selected second segment is similar to the third segment, at least one of not transmitting the selected second segment to the selected endpoint and dropping the second segment during transmission.

21. A logic circuit configured to perform steps comprising:
(a) receiving a voice stream from a user, the voice stream comprising a plurality of temporally distinct segments; and
(b) processing at least first, second and third segments of the voice stream according to the following substeps:
(i) selecting the first segment, wherein the contents of the selected first segment are not product of voice activity;
(ii) determining that the contents of the selected first segment are not the product of voice activity;
(iii) determining a level of confidence that the voice activity determination for the selected first segment is accurate;
(iv) when the level of confidence is one of less than and greater than a predetermined threshold, not transmitting the selected first segment to a selected endpoint;
(v) selecting the second segment, wherein the contents of the selected second segment are the product of voice activity and wherein the second and third segments are temporally adjacent to one another;
(vi) determining that the contents of the selected segment are the product of voice activity;
(vii) comparing the selected second segment with the third segment to determine a degree of acoustic similarity between the second and third segments; and
(viii) when the selected second segment is similar to the third segment, at least one of not transmitting the selected second segment to the selected endpoint and dropping the second segment during transmission.

22. A method for processing voice communications over a data network, comprising:

(a) receiving a voice stream from a user, the voice stream comprising a plurality of temporally distinct segments; and (b) processing the segments of the voice stream according to the following rules:
  (i) determining whether or not the content of a selected segment is a product of voice activity;
  (ii) when the content of the selected segment is determined not to be the product of voice activity, determining a level of confidence that the voice activity determination for the selected segment is accurate;
  (iii) when the level of confidence is one of less than and greater than a predetermined threshold, not transmitting the selected segment to a selected endpoint;
  (iv) when the content of the selected segment is determined to be the product of voice activity, comparing the selected segment with at least one temporally adjacent segment to determine a degree of acoustic similarity between the selected and at least one temporally adjacent segments; and
  (v) when the selected segment is similar to the at least one temporally adjacent segment, at least one of not transmitting the selected segment to the selected endpoint and transmitting a packet comprising the selected segment with a level of importance lower than a packet comprising a dissimilar segment.

23. The method of claim 22, wherein, when the level of confidence is the other of less than and greater than the predetermined threshold, determining a level of importance of the selected segment.

24. The method of claim 23, wherein the level of importance is a transmission priority of a packet comprising the selected segment.

25. The method of claim 24, wherein segments determined not to be a product of voice activity have a lower level of importance than dissimilar segments determined to be a product of voice activity.

26. The method of claim 23, wherein the level of importance is a value marker placed in a header and/or payload of a packet comprising the selected segment.

27. The method of claim 26, wherein, when a communication link with the selected endpoint is determined to be congested, packets having value markers having values less than a predetermined level are dropped.

28. The method of claim 22, wherein, when the selected segment is dissimilar to the at least one temporally adjacent segment, transmitting the selected segment to the selected endpoint.

29. The method of claim 28, wherein the at least one temporally adjacent segment comprises a segment temporally preceding the selected segment and a segment temporally following the selected segment.

30. The method of claim 29, wherein packets comprising similar content are sent with a lower priority than packets comprising dissimilar content.

31. The method of claim 29, wherein packets comprising similar content comprise value markers having a value lower than packets comprising dissimilar content.

32. A computer readable medium comprising processor-executable instructions operable to perform steps comprising:
  (a) receiving a voice stream from a user, the voice stream comprising a plurally of temporally distinct segments; and
  (b) processing the segments of the voice stream according to the following rules:
    (i) determining whether or not the content of a selected segment is a product of voice activity
    (iii) when the content of the selected segment is determined not to be the product of voice activity, determining a level of confidence that the voice activity determination for the selected segment is accurate;
    (iii) when the level of confidence is one of less than and greater than a predetermined threshold, not transmitting the selected segment to a selected endpoint;
    (iv) when the content of the selected segment is determined to be the product of voice activity, comparing the selected segment with at least one temporally adjacent segment to determine a degree of acoustic similarity between the selected and at least one temporally adjacent segments; and
    (v) when the selected segment is similar to the at least one temporally adjacent segment, at least one of not transmitting the selected segment to the selected endpoint and transmitting a packet comprising the selected segment with a level of importance lower than a packet comprising a dissimilar segment.

33. The medium of claim 32, wherein, when the level of confidence is the other of less than and greater than the predetermined threshold, determining a level of importance of the selected segment.

34. The medium of claim 33, wherein the level of importance is a transmission priority of a packet comprising the selected segment.

35. The medium of claim 33, wherein segments determined not to be a product of voice activity have a lower level of importance than dissimilar segments determined to be a product of voice activity.

36. The medium of claim 32, wherein the level of importance is a value marker placed in a header and/or payload of a packet comprising the selected segment.

37. The medium of claim 36, wherein, when a communication link with the selected endpoint is determined to be congested, packets having value markers having values less than a predetermined level are dropped.

38. The medium of claim 32, wherein, when the selected segment is dissimilar to the at least one temporally adjacent segment, transmitting the selected segment to the selected endpoint.

39. The medium of claim 38, wherein the at least one temporally adjacent segment comprises a segment temporally preceding the selected segment and a segment temporally following the selected segment.

40. The medium of claim 39, wherein packets comprising similar content are sent with a lower priority than packets comprising dissimilar content.

41. The medium of claim 39, wherein packets comprising similar content comprise value markers having a value lower than packets comprising dissimilar content.

42. A logic circuit operable to perform steps comprising:
  (a) receiving a voice stream from a user, the voice stream comprising a plurality of temporally distinct segments; and
  (b) processing the segments of the voice stream according to the following rules:
    (i) determining whether or not the content of a selected segment is a product of voice activity;
    (iii) when the content of the selected segment is determined not to be the product of voice activity, determining a level of confidence that the voice activity determination for the selected segment is accurate;

(iii) when the level of confidence is one of less than and greater than a predetermined threshold, not transmitting the selected segment to a selected endpoint;

(iv) when the content of the selected segment is determined to be the product of voice activity, comparing the selected segment with at least one temporally adjacent segment to determine a degree of acoustic similarity between the selected and at least one temporally adjacent segments; and (v) when the selected segment is similar to the at least one temporally adjacent segment, at least one of not transmitting the selected segment to the selected endpoint and transmitting a packet comprising the selected segment with a level of importance lower than a packet comprising a dissimilar segment.

43. The circuit of claim 42, wherein, when the level of confidence is the other of less than and greater than the predetermined threshold, determining a level of importance of the selected segment.

44. The circuit of claim 43, wherein the level of importance is a transmission priority of a packet comprising the selected segment.

45. The circuit of claim 43, wherein segments determined not to be a product of voice activity have a lower level of importance than dissimilar segments determined to be a product of voice activity.

46. The circuit of claim 42, wherein the level of importance is a value marker placed in a header and/or payload of a packet comprising the selected segment.

47. The circuit of claim 46, wherein, when a communication link with the selected endpoint is determined to be congested, packets having value markers having values less than a predetermined level are dropped.

48. The circuit of claim 42, wherein, when the selected segment is dissimilar to the at least one temporally adjacent segment, transmitting the selected segment to the selected endpoint.

49. The circuit of claim 48, wherein the at least one temporally adjacent segment comprises a segment temporally preceding the selected segment and a segment temporally following the selected segment.

50. The circuit of claim 49, wherein packets comprising similar content are sent with a lower priority than packets comprising dissimilar content.

51. The circuit of claim 49, wherein packets comprising similar content comprise value markers having a value lower than packets comprising dissimilar content.

* * * * *